(12) United States Patent
Kim et al.

(10) Patent No.: US 11,683,603 B2
(45) Date of Patent: Jun. 20, 2023

(54) IMAGE SENSOR INCLUDING PIXELS AND REFERENCE PIXELS, OPERATING METHOD OF THE IMAGE SENSOR, AND ELECTRONIC DEVICE INCLUDING THE IMAGE SENSOR

(71) Applicant: SAMSUNG ELECTRONICS CO., LTD., Suwon-si (KR)

(72) Inventors: Hwanwoong Kim, Namyangju-si (KR); Jihun Kim, Suwon-si (KR); Jueun Park, Seongnam-si (KR); Jungwook Lim, Hwaseong-si (KR); Youjin Jeong, Suwon-si (KR); Taesub Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/529,744

(22) Filed: Nov. 18, 2021

(65) Prior Publication Data

US 2022/0286629 A1   Sep. 8, 2022

(30) Foreign Application Priority Data

Mar. 8, 2021 (KR) .......................... 10-2021-0030306

(51) Int. Cl.
*H04N 25/63*   (2023.01)
*H04N 25/62*   (2023.01)

(52) U.S. Cl.
CPC ............. *H04N 25/63* (2023.01); *H04N 25/62* (2023.01)

(58) Field of Classification Search
CPC .............................. H04N 5/361; H04N 5/359
See application file for complete search history.

(56) References Cited

U.S. PATENT DOCUMENTS

| | | | |
|---|---|---|---|
| 7,361,877 B2 | 4/2008 | McGrath et al. |
| 8,179,461 B2 | 5/2012 | Suzuki et al. |
| 9,106,854 B2 | 8/2015 | Adkisson et al. |
| 9,349,762 B2 | 5/2016 | Cho et al. |
| 9,706,142 B2 | 7/2017 | Hynecek |
| 10,075,626 B2 | 9/2018 | Blanquart et al. |
| 2003/0202111 A1 | 10/2003 | Park |
| 2008/0136945 A1 | 6/2008 | Blanquart et al. |

FOREIGN PATENT DOCUMENTS

| | | |
|---|---|---|
| KR | 10-0455395 | 11/2004 |
| WO | 2009/100038 | 8/2009 |

*Primary Examiner* — Twyler L Haskins
*Assistant Examiner* — Angel L Garces-Rivera
(74) *Attorney, Agent, or Firm* — F. Chau & Associates, LLC

(57) ABSTRACT

An image sensor includes: a pixel array including pixels and reference pixels; an analog sensing circuit configured to sense signals from the pixels and the reference pixels; and a digital logic circuit configured to receive the sensed signals from the analog sensing circuit and configured to compensate signals corresponding to the pixels from among the sensed signals by using signals corresponding to the reference pixels from among the sensed signals, wherein each of the reference pixels is at least partially surround by the pixels.

20 Claims, 13 Drawing Sheets

IMAGE SENSOR INCLUDING PIXELS AND REFERENCE PIXELS, OPERATING METHOD OF THE IMAGE SENSOR, AND ELECTRONIC DEVICE INCLUDING THE IMAGE SENSOR

CROSS-REFERENCE TO RELATED APPLICATION

This application claims priority under 35 U.S.C. § 119 to Korean Patent Application No. 10-2021-0030306 filed on Mar. 8, 2021, in the Korean Intellectual Property Office, the disclosure of which is incorporated by reference herein in in its entirety.

TECHNICAL FIELD

Exemplary embodiments of the present inventive concept relate to an electronic device, and more particularly, to an image sensor, an operating method of the image sensor, and an electronic device including the image sensor.

DISCUSSION OF THE RELATED ART

Generally, an image sensor may capture an incident light to generate image data based on the incident light. The image sensor may be mounted in various mobile devices, such as a smartphone and a tablet computer, to generate multimedia content.

As technology for manufacturing an image sensor develops, the resolution of the image sensor may increase. The increase in the resolution of the image sensor may make circuits constituting the image sensor further complicated. In addition, as the technology for manufacturing an image sensor further develops, various functions may be added to the image sensor, and circuits capable of performing the functions may be added to the image sensor.

The increase in complexity of the circuits constituting the image sensor and the addition of functions and circuits to the image sensor make it possible to increase the quality of image data captured and generated by the image sensor. However, the increase in the complexity of the circuits constituting the image sensor and the addition of the functions and the circuits to the image sensor may cause noise in the image data captured and generated by the image sensor.

SUMMARY

According to an exemplary embodiment of the present inventive concept, an image sensor includes: a pixel array including pixels and reference pixels; an analog sensing circuit configured to sense signals from the pixels and the reference pixels; and a digital logic circuit configured to receive the sensed signals from the analog sensing circuit and configured to compensate signals corresponding to the pixels from among the sensed signals by using signals corresponding to the reference pixels from among the sensed signals, wherein each of the reference pixels is at least partially surround by the pixels.

According to an exemplary embodiment of the present inventive concept, an operating method of an image sensor including pixels and reference pixels includes: sensing signals from the pixels and the reference pixels; compensating signals of the pixels from among the sensed signals, based on signals corresponding to the reference pixels from among the sensed signals; and outputting the compensated signals, wherein the reference pixels are disposed between the pixels.

According to an exemplary embodiment of the present inventive concept, an electronic device includes: a processor; and an image sensor configured to generate image data and configured to provide the image data to the processor. The image sensor includes: a pixel array including pixels and reference pixels; an analog sensing circuit configured to sense signals from the pixels and the reference pixels; a digital logic circuit configured to receive the sensed signals from the analog sensing circuit and configured to compensate signals corresponding to the pixels from among the sensed signals by using signals corresponding to the reference pixels from among the sensed signals; and an interface circuit configured to output the compensated signals as the image data to the processor. Each of the reference pixels includes: a photodiode; reflection material disposed on the photodiode; a color filter disposed on the reflection material; and a micro lens disposed on the color filter.

BRIEF DESCRIPTION OF THE DRAWINGS

The above and other features of the present inventive concept will become more apparent by describing in detail exemplary embodiments thereof, with reference to the accompanying drawings, in which.

DETAILED DESCRIPTION OF THE EMBODIMENTS

Below, exemplary embodiments of the present inventive concept will be described more fully hereinafter with reference to the accompanying drawings. The term "and/or" as used hereinafter includes any and all combinations of one or more of the associated listed items.

Figure 1:
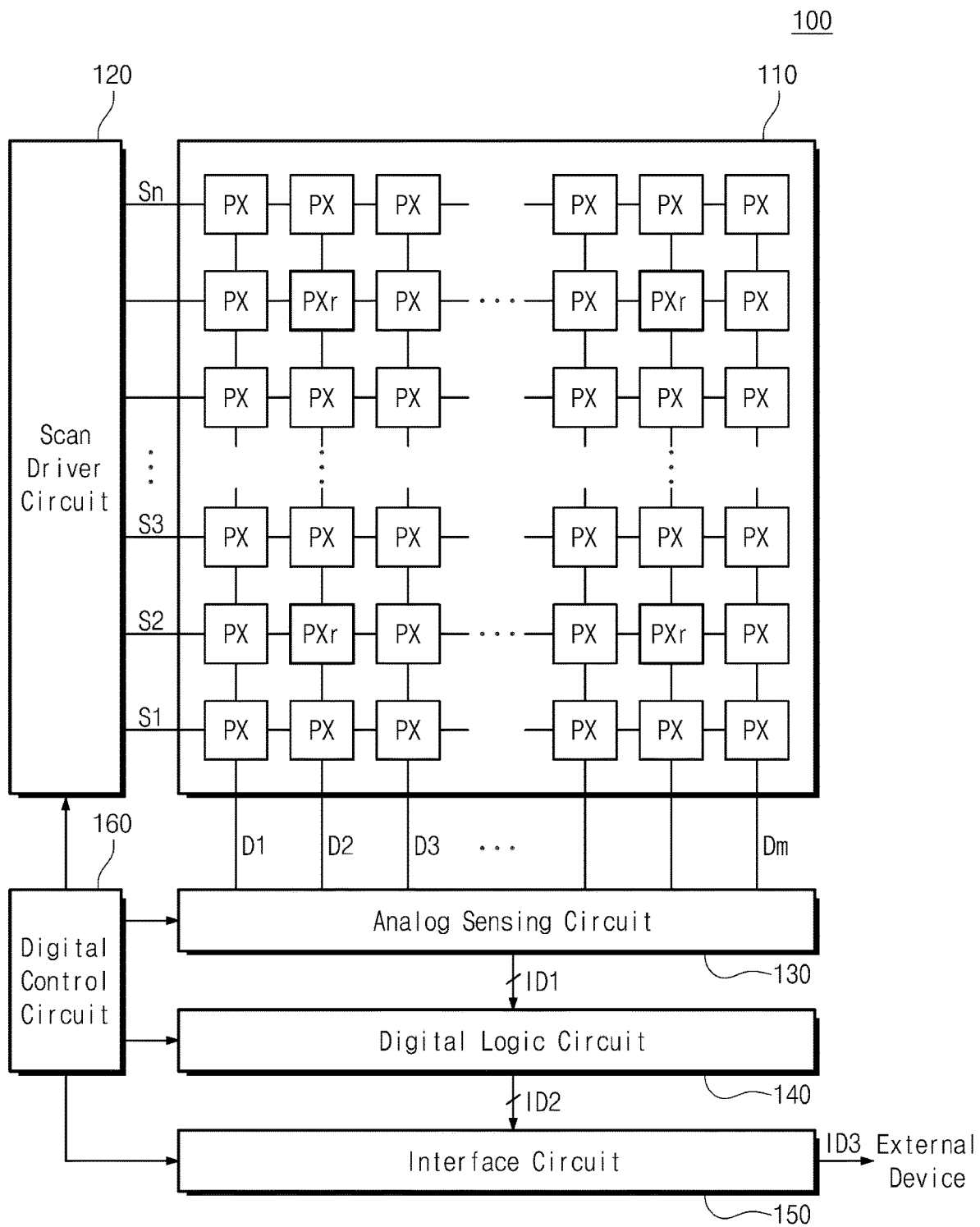
FIG. 1 illustrates an image sensor according to an exemplary embodiment of the present inventive concept.

FIG. 1 illustrates an image sensor 100 according to an exemplary embodiment of the present inventive concept. Referring to FIG. 1, the image sensor 100 may include a pixel array 110, a scan driver circuit 120, an analog sensing circuit 130, a digital logic circuit 140, an interface circuit 150, and a digital control circuit 160.

The pixel array 110 may include pixels PX and reference pixels PXr. The pixels PX and the reference pixels PXr may be arranged in rows and columns. Each of the reference pixels PXr may be interposed between pixels PX or may be surrounded by pixels PX.

Each of the pixels PX may generate a voltage or a current corresponding to the amount of incident light. Each of the reference pixels PXr may generate a voltage or a current regardless of the amount of incident light. For example, each of the reference pixels PXr may generate a voltage or a current corresponding to a leakage of a dark level.

The leakage of the dark level may correspond to a current (or electrons) leaked out from a pixel PX or a reference pixel PXr. For example, the reference pixels PXr may be exposed to an incident light together with the pixels PX, but the reference pixels PXr may generate a voltage or a current corresponding to the leakage of the dark level regardless of the amount of incident light unlike the pixels PX.

The scan driver circuit 120 may be connected with the pixels PX and the reference pixels PXr in the rows of the pixel array 110 through first to n-th scan lines S1 to Sn. The scan driver circuit 120 may sequentially (or, e.g., alternately) select the first to n-th scan lines S1 to Sn under control of the digital control circuit 160.

In response to one of the first to n-th scan lines S1 to Sn that is selected, the scan driver circuit 120 may reset pixels PX and/or reference pixels PXr connected with the selected scan line.

After the pixels PX and/or the reference pixels PXr connected with the selected scan line are reset, the pixels PX may adjust a voltage or current of a reset level in response to the amount of incident light. After the pixels PX and/or the reference pixels PXr connected with the selected scan line are reset, the reference pixels PXr may adjust a voltage or current of a reset level in response to a leakage of a dark level.

In response to a specific time that passes after the pixels PX and/or the reference pixels PXr connected with the selected scan line are reset (or under control of the digital control circuit 160), the scan driver circuit 120 may electrically connect the pixels PX and/or the reference pixels PXr of the selected scan line with first to m-th data lines D1 to Dm.

An example with reference to FIG. 1, the scan driver circuit 120 is connected with pixels PX and reference pixels PXr in one row through one scan line. However, the present inventive concept is not limited thereto. For example, the scan driver circuit 120 may be connected with pixels PX and reference pixels PXr in one row through two or more lines.

For example, one of the two or more lines may be used to reset pixels PX and/or reference pixels PXr in the corresponding row. At least another of the two or more lines may be used to electrically connect the pixels PX and/or the reference pixels PXr in the corresponding row with the first to m-th data lines D1 to Dm.

The analog sensing circuit 130 may be connected with the pixels PX and the reference pixels PXr in the columns of the pixel array 110 through first to m-th data lines D1 to Dm. Under control of the digital control circuit 160, the analog sensing circuit 130 may sense signals (e.g., voltages or currents) of the first to m-th data lines D1 to Dm at a timing when pixels PX and/or reference pixels PXr of a selected row are connected with the first to m-th data lines D1 to Dm.

The analog sensing circuit 130 may output the sensed signals as first image data ID1. The first image data ID1 may be based on the signals of the pixels PX and/or the reference pixels PXr of the selected row.

For example, the analog sensing circuit 130 may include a ramp signal generator that generates a ramp signal having a linearly increasing or decreasing level. The analog sensing circuit 130 may further include comparators that compare the signals of the pixels PX and/or the reference pixels PXr of the selected row with the ramp signal.

The analog sensing circuit 130 may further include counters that convert timings, at which outputs of the comparators are changed, into digital values. The analog sensing circuit 130 may output the digital values output from the counters as the first image data ID1. For example, the first image data ID1 output from the analog sensing circuit 130 may be signals that correspond to a result of sensing the signals of the pixels PX and/or the reference pixels PXr by the analog sensing circuit 130.

The digital logic circuit 140 may receive the first image data ID1 from the analog sensing circuit 130. Under control of the digital control circuit 160, the digital logic circuit 140 may receive the first image data ID1, for example, the signals sensed from the pixels PX and/or the reference pixels PXr.

The digital logic circuit 140 may compensate for the signals of the pixels PX by using the signals of the reference pixels PXr. For example, the digital logic circuit 140 may perform compensation by adding a digital value of the signals of the pixels PX to a digital value of the signals of the reference pixels PXr (or, e.g., a value derived therefrom) or by subtracting the digital value of the signals of the reference pixels PXr (or, e.g., a value derived therefrom) from the digital value of the signals of the pixels PX.

Under control of the digital control circuit 160, the digital logic circuit 140 may output the compensated signals as second image data ID2. The interface circuit 150 may receive the second image data ID2 from the digital logic circuit 140. Under control of the digital control circuit 160 or in response to the received second image data ID2, the interface circuit 150 may output the second image data ID2 as third image data ID3 to an external device.

For example, the interface circuit 150 may output the third image data ID3 to the external device based on the C-PHY or D-PHY defined by the MIPI (Mobile Industry Processor Interface).

The digital control circuit 160 may control the following: 1) a timing when the scan driver circuit 120 selects the first to n-th scan lines S1 to Sn; 2) a timing when the analog sensing circuit 130 output the first image data ID1 as a result of sensing signals of the first to m-th data lines D1 to Dm; 3) a timing when the digital logic circuit 140 outputs the second image data ID2 as a result of making compensation for signals from the pixels PX; and/or 4) a timing when the interface circuit 150 outputs the third image data ID3.

Figure 2:
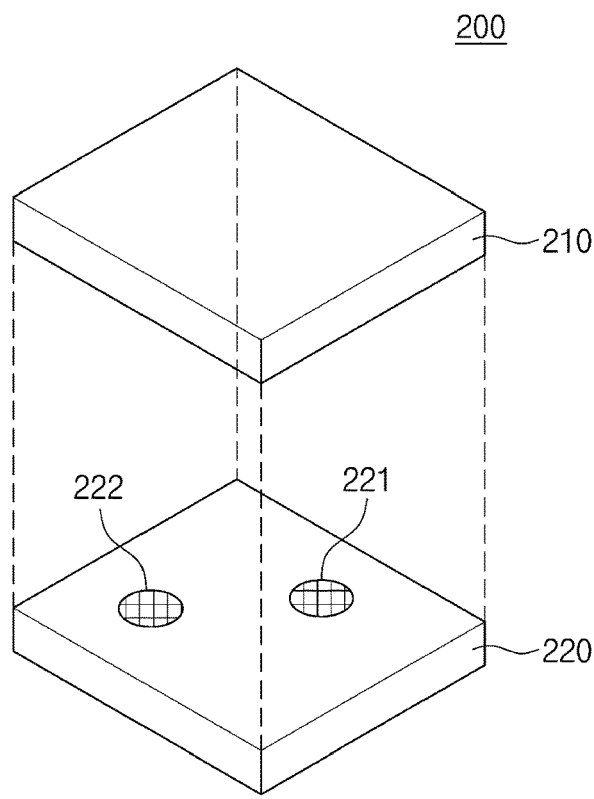
FIG. 2 illustrates an implementation of an image sensor according to an exemplary embodiment of the present inventive concept.

FIG. 2 illustrates an implementation of an image sensor 200 according to an exemplary embodiment of the present inventive concept. The image sensor 200 may correspond to an example in which the image sensor 100 of FIG. 1 is implemented. Referring to FIGS. 1 and 2, the image sensor 200 may include a first substrate 210 and a second substrate 220.

The pixel array 110 may be implemented at the first substrate 210. The scan driver circuit 120, the analog sensing circuit 130, the digital logic circuit 140, the interface circuit 150, and the digital control circuit 160 may be implemented at the second substrate 220. The first substrate 210 and the second substrate 220 may be electrically coupled to each other through vertical wires.

The pixels PX and the reference pixels PXr of the pixel array 110 may have the same structures as each other and may be used at the same frequency as each other. Accordingly, heat generated by the pixels PX and the reference pixels PXr at the first substrate 210 may be substantially uniform regardless of a location on the first substrate 210, that is, a location on the pixel array 110.

The scan driver circuit 120, the analog sensing circuit 130, the digital logic circuit 140, the interface circuit 150, and the digital control circuit 160 implemented at the second substrate 220 may have different structures from each other, may implement different functions from each other, and may be different in the frequency of operation than each other.

Accordingly, heat generated by the scan driver circuit 120, the analog sensing circuit 130, the digital logic circuit 140, the interface circuit 150, and the digital control circuit 160 at the second substrate 220 may be different from one another depending on their locations on the second substrate 220, that is, a location on the pixel array 110.

For example, a first heat source 221 and a second heat source 222 marked on the second substrate 220 may generate heat higher than that of other portions of the second substrate 220. The heat generated at the second substrate 220 may affect the first substrate 210. For example, the heat generated at the second substrate 220 may affect the amounts of dark-level leakages of the pixels PX and the reference pixels PXr of the pixel array 110 implemented at the first substrate 210.

In the case where heat generated at the second substrate 220 changes depending on a location of a component on the pixel array 110, dark-level leakages of the pixels PX and the reference pixels PXr of the pixel array 110 may change depending on locations of the pixels PX and the reference pixels PXr on the pixel array 110. Accordingly, signals sensed by the pixel array 110 may be disturbed by a change in the dark-level leakages, thereby causing the reduction of quality of image data ID1, ID2 or ID3.

Figure 3:
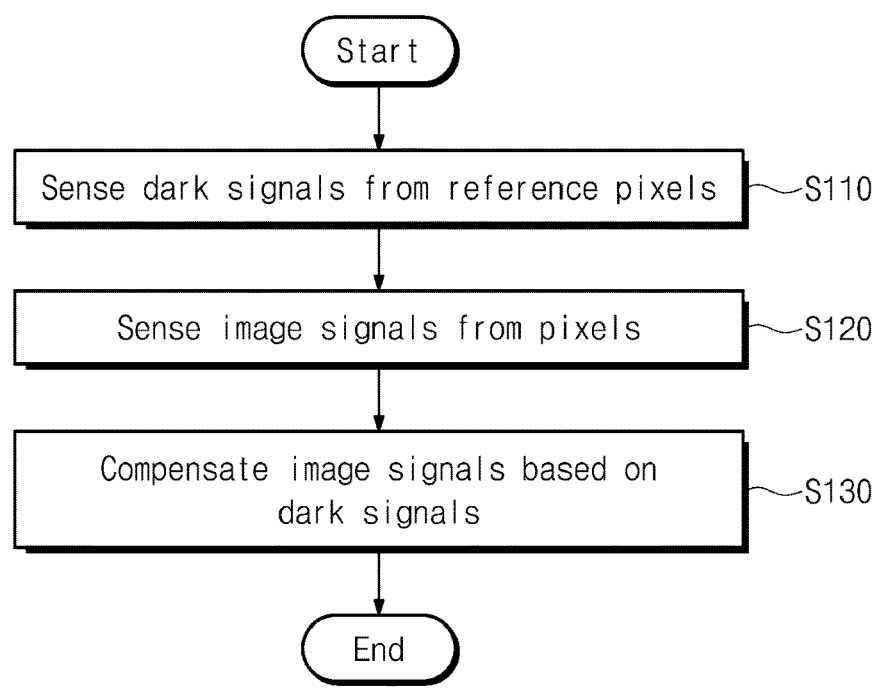
FIG. 3 illustrates an operating method of an image sensor according to an exemplary embodiment of the present inventive concept.

FIG. 3 illustrates an operating method of the image sensor 100 according to an exemplary embodiment of the present inventive concept. Referring to FIGS. 1 and 3, in operation S110, the image sensor 100 may sense dark signals from the reference pixels PXr. The dark signals may be signals sensed from reference pixels PXr of a selected row and may correspond to leakages of a dark level.

In operation S120, the image sensor 100 may sense image signals from the pixels PX. The image signals may be signals sensed from pixels PX of the selected row and may correspond to the amount of incident light and the leakages of the dark level.

For example, operation S110 may be performed in response to a scan signal transmitted to a selected scan line corresponding to a row including the reference pixels PXr. Operation S120 may be performed in response to each of the selected first to n-th scan lines S1 to Sn.

In operation S130, the image sensor 100 may compensate the image signals sensed from the pixels PX, based on the dark signals sensed from the reference pixels PXr. For example, pixels PX of a currently selected row may be compensated based on the dark signals of the reference pixels PXr of the currently selected row or a previously selected row.

The image signals of the pixels PX of the currently selected row may be stored in the digital logic circuit 140. The stored image signals may be compensated based on dark signals of reference pixels PXr of a row selected next. For example, each of the image signals of the pixels PX may be compensated based on a dark signal(s) of at least one (or two) reference pixel PXr, among the reference pixels PXr, adjacent to each of the pixels PX.

After that, the image sensor 100 may output the compensated image signals as image data, for example, as the third image data ID3.

According to an exemplary embodiment of the present inventive concept, a difference between dark levels caused by a difference of heat according to a location, which is generated at the second substrate 220, may be compensated. Accordingly, the quality of the third image data ID3 generated by the image sensor 100 may be increased.

Figure 4:
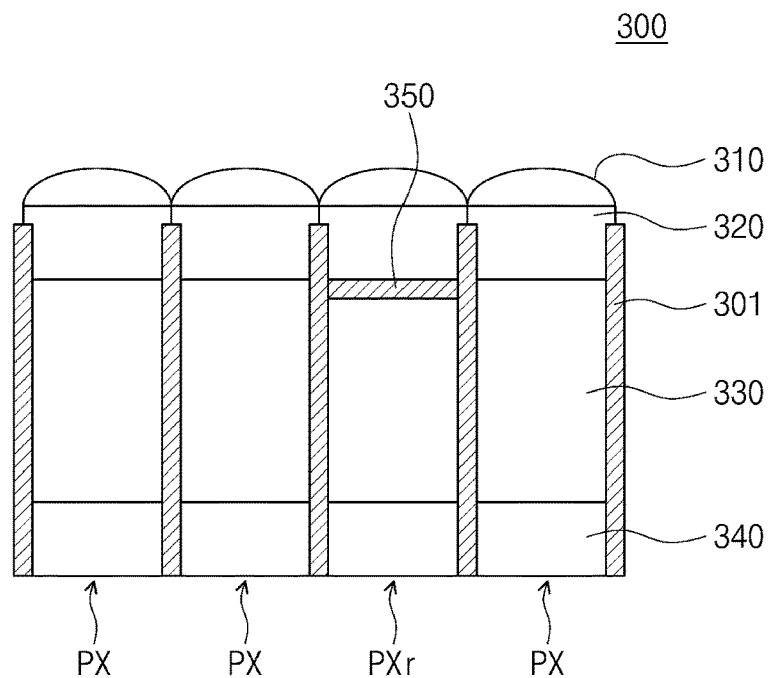
FIG. 4 illustrates pixels and a reference pixel according to an exemplary embodiment of the present inventive concept.

FIG. 4 illustrates pixels PX and a reference pixel PXr according to an exemplary embodiment of the present inventive concept. An example of a reference pixel PXr between two pixels PX is illustrated in FIG. 4. As an example, FIG. 4 illustrates that two pixels PX are to the left of the reference pixel PXr, and one pixel PX is to the right of the reference pixel PXr; however, the present inventive concept is not limited thereto.

Referring to FIGS. 1 and 4, each of the pixels PX and the reference pixel PXr may include a micro lens 310, a color filter 320, an isolation space 330, and a light sensing circuit 340. The micro lens 310 is configured to concentrate an incident light. The color filter 320 is placed under the micro lens 310. The isolation space 330 is placed under the color filter 320 to concentrate and transmit the incident light. The light sensing circuit 340 is placed under the isolation space 330 and includes a photodiode and transistors.

First reflection materials 301 may be placed at boundaries between the pixels PX and the reference pixel PXr. The first reflection materials 301 may support the concentration and transfer of the incident light in the isolation space 330.

The light sensing circuit 340 may include transistors connected with the corresponding scan line of the first to n-th scan lines S1 to Sn and the corresponding data line of the first to m-th data lines D1 to Dm, and a photodiode generating a current (or a voltage) corresponding to an incident light as the transistors are controlled.

Unlike the pixels PX, the reference pixel PXr may further include a second reflection material 350 interposed between the color filter 320 and the isolation space 330 to separate the color filter 320 and the isolation space 330 from each other. The second reflection material 350 may reflect an incident light to the outside such that the incident light is prevented from being transferred to the isolation space 330.

Figure 5:
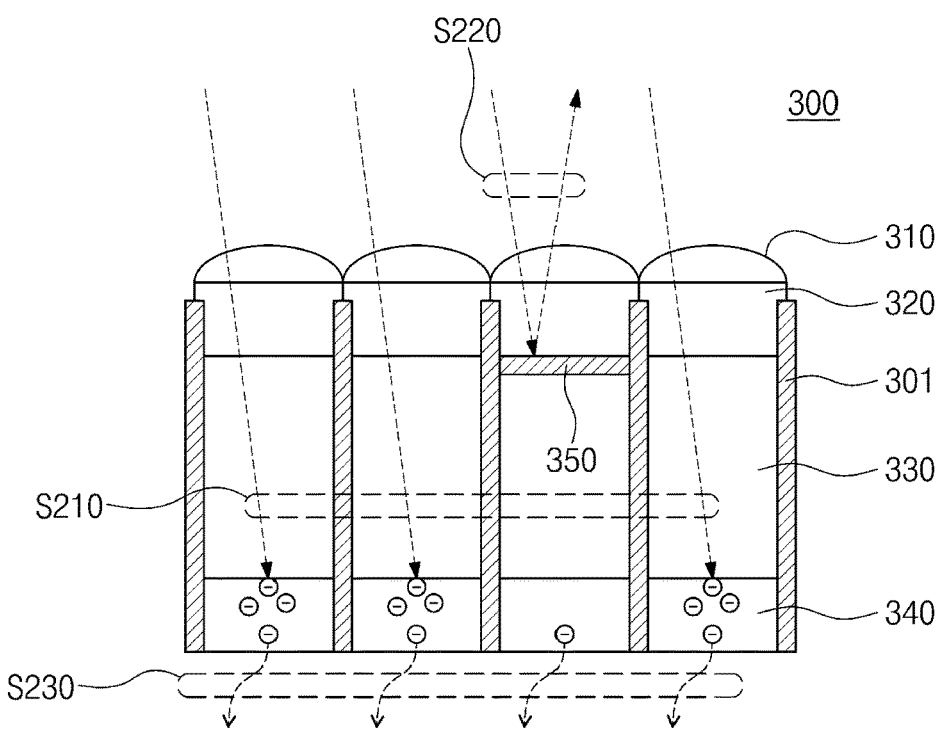
FIG. 5 illustrates sensing of pixels and a reference pixel according to an exemplary embodiment of the present inventive concept.

FIG. 5 illustrates sensing at the pixels PX and the reference pixel PXr according to an exemplary embodiment of the present inventive concept. The pixels PX and the reference pixel PXr of FIG. 5 are the same as the pixels PX and the reference pixel PXr described with reference to FIG. 4, and thus, redundant descriptions may be omitted to avoid redundancy.

Referring to FIGS. 1 and 5, in operation S210, a light incident onto the pixels PX may be transferred to the photodiode of the light sensing circuit 340. The photodiode may generate a current (or electrons) in response to an incident light. In the light sensing circuit 340, a voltage (or a current) of a reset level may change depending on the current (or electrons) generated by the photodiode.

In operation S220, a light is not incident onto the reference pixel PXr. For example, light is reflected by the second reflection material 350. Accordingly, the photodiode of the reference pixel PXr does not generate a current (or electrons) corresponding to the incident light. In the light sensing circuit 340 of the reference pixel PXr, a voltage (or current) of a reset level may not be changed by the incident light.

In operation S230, dark-level leakages may occur at the pixels PX and the reference pixel PXr. Currents (or electrons) may be leaked out from the pixels PX and the reference pixel PXr by the dark-level leakages.

A signal sensed from each pixel PX may indicate a value corresponding to a change in an amount of the voltage (or current) of the reset level due to the incident light and the dark-level leakage. A signal sensed from the reference pixel PXr may indicate a value corresponding to a change in an amount of the voltage (or current) of the reset level due to the dark-level leakage. Accordingly, dark-level leakages of the pixels PX may be compensated based on the amount of dark-level leakage measured from the reference pixel PXr.

As described with reference to FIG. 2, a dark-level leakage may change depending on its location on the pixel array 110. The amounts of dark-level leakages according to their locations on the pixel array 110 may be measured by distributing and disposing the reference pixels PXr on the pixel array 110. In addition, dark-level leakages of the pixels PX according to their locations on the pixel array 110 may be compensated.

Figure 6:
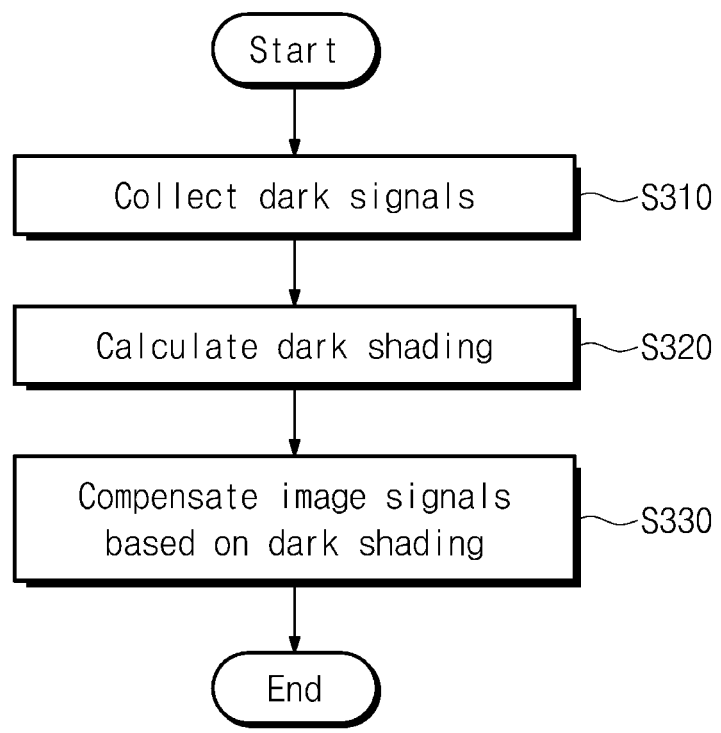
FIG. 6 illustrates a method in which an image sensor according to an exemplary embodiment of the present inventive concept compensates dark-level leakages.

FIG. 6 illustrates a method in which the image sensor 100 according to an exemplary embodiment of the present inventive concept compensates dark-level leakages. Referring to FIGS. 1 and 6, in operation S310, the digital logic circuit 140 of the image sensor 100 may collect dark signals from the reference pixels PXr.

In operation S320, the digital logic circuit 140 of the image sensor 100 may calculate dark shading from the dark signals. For example, the dark shading may indicate a distribution of dark levels of image signals according to locations of the dark levels on image data, which are generated by the pixels PX of the pixel array 110.

In operation S330, the digital logic circuit 140 may compensate image signals based on the dark shading. For example, the digital logic circuit 140 may compensate values (e.g., gray levels) of image signals of pixels PX adjacent to a specific reference pixel PXr, based on a dark signal of the specific reference pixel PXr.

The digital logic circuit 140 may compensate image signals of pixels PX, based on various values of dark levels such as a minimum value, a maximum value, an intermediate value, and an average value of dark levels corresponding to the dark shading. For example, the digital logic circuit 140 may compensate a DC level and/or a gain of values (e.g., gray levels) of image signals of pixels PX.

Figure 7:
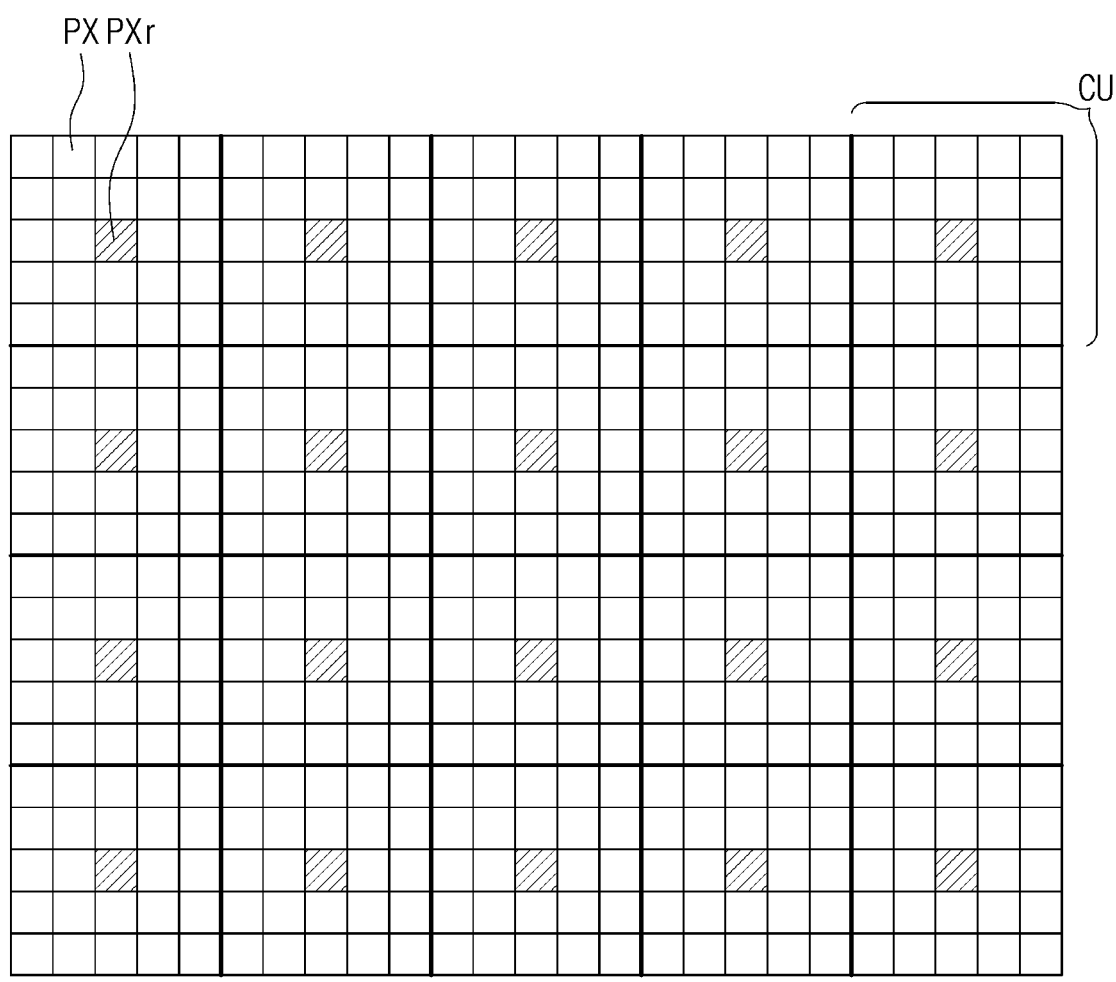
FIG. 7 illustrates an example in which compensation is performed by using pixels and reference pixels, according to an exemplary embodiment of the present inventive concept.

FIG. 7 illustrates an example in which compensation is performed by using the pixels PX and the reference pixels PXr, according to an exemplary embodiment of the present inventive concept. Referring to FIGS. 1 and 7, compensation may be performed based on a compensation unit CU. The pixels PX and the reference pixels PXr of the pixel array 110 may be divided into compensation units CU.

Each of the compensation units CU may include one reference pixel PXr and pixels PX arranged in two or more rows and two or more columns. In each compensation unit CU, the reference pixel PXr may be placed at the center of the pixels PX or a central region of each compensation unit CU. Image signals of the pixels PX belonging to the compensation unit CU may be compensated based on a dark signal of the reference pixel PXr belonging to the same compensation unit CU as the pixels PX.

In each of the compensation units CU, image signals of pixels PX of rows that are selected prior to a row including the reference pixel PXr may be stored in the digital logic circuits 140. After the dark signal is sensed from the reference pixel PXr, the compensation for the stored image signals may be performed.

In each of the compensation units CU, image signals of pixels PX of the same row as the reference pixel PXr may be compensated by using the dark signal sensed from the reference pixel PXr. In addition, in each of the compensation units CU, image signals of pixels PX of rows that are selected after the row of the reference pixel PXr may be compensated by using the dark signal sensed from the reference pixel PXr.

Figure 8:
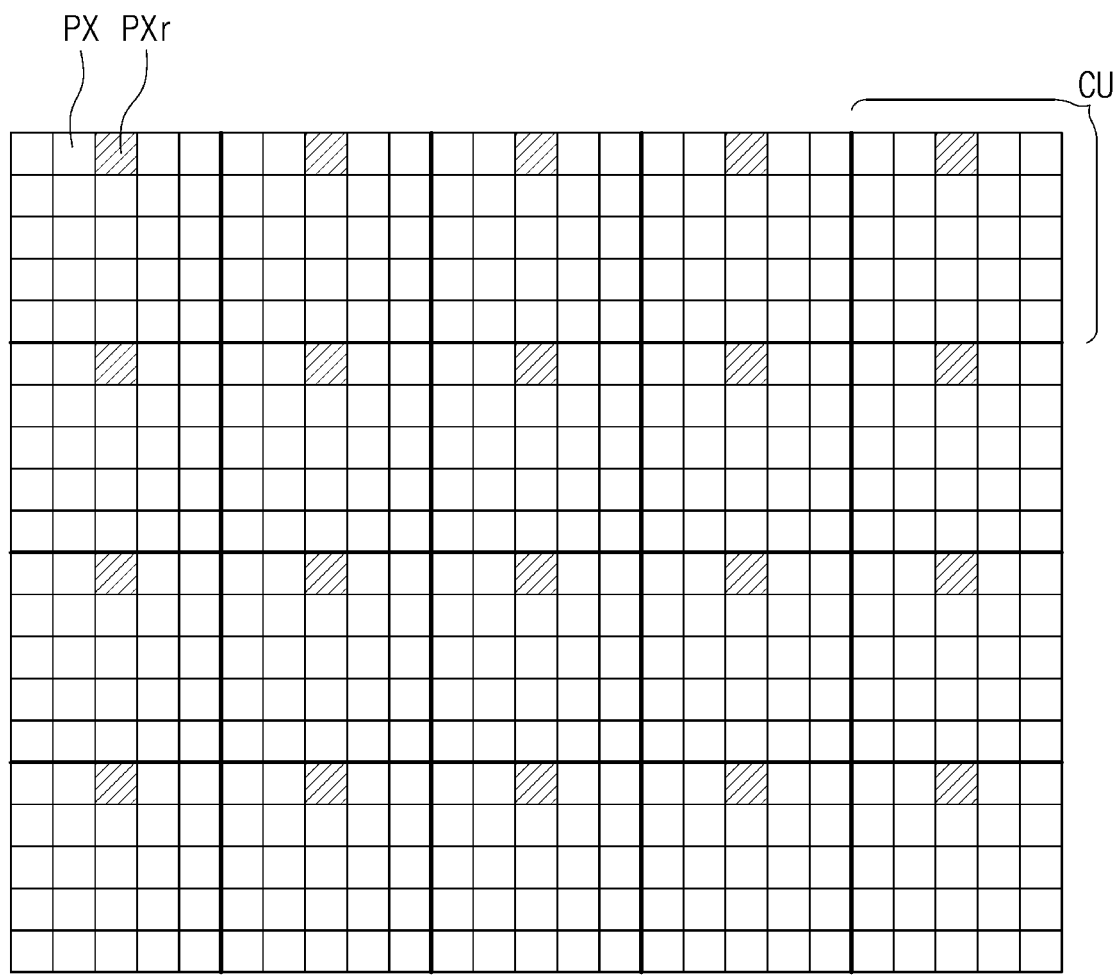
FIG. 8 illustrates an example in which compensation is performed by using pixels and reference pixels, according to an exemplary embodiment of the present inventive concept.

FIG. 8 illustrates an example in which compensation is performed by using the pixels PX and the reference pixels PXr, according to an exemplary embodiment of the present inventive concept. Referring to FIGS. 1 and 8, compensation may be performed based on a compensation unit CU. The pixels PX and the reference pixels PXr of the pixel array 110 may be divided into compensation units CU.

Each of the compensation units CU may include one reference pixel PXr and pixels PX arranged in two or more rows and two or more columns. The reference pixel PXr may be placed at a first row among rows included to each of the compensation units CU. For example, the first row including the reference pixel PXr may be the first selected row. Image signals of the pixels PX belonging to the compensation unit CU may be compensated based on a dark signal of the reference pixel PXr belonging to the same compensation unit CU as the pixels PX.

In each of the compensation units CU, image signals of pixels PX of the same row as the reference pixel PXr may be compensated by using the dark signal sensed from the reference pixel PXr. In addition, in each of the compensation units CU, image signals of pixels PX of rows that are selected after the row of the reference pixel PXr may be compensated by using the dark signal sensed from the reference pixel PXr.

Figure 9:
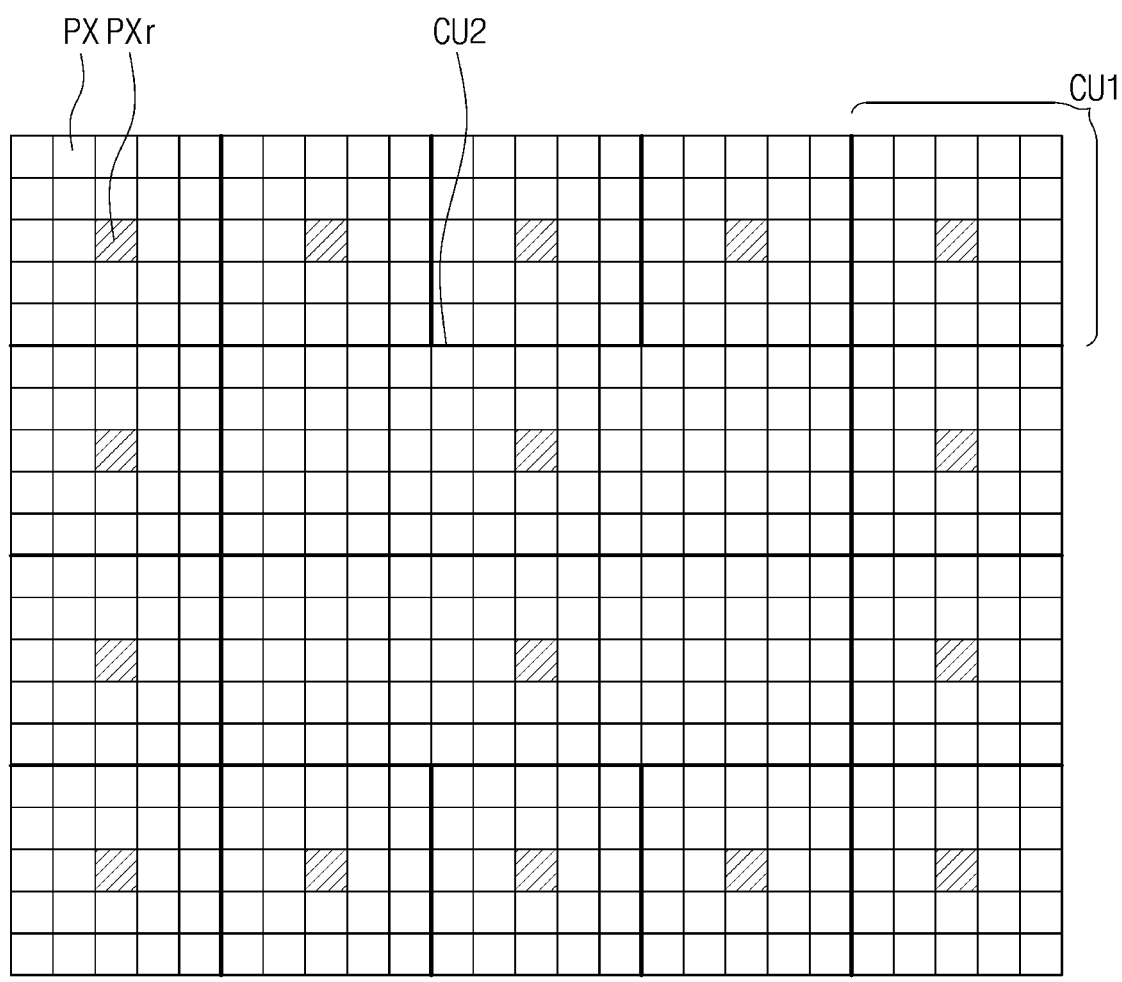
FIG. 9 illustrates an example in which compensation is performed by using pixels and reference pixels, according to an exemplary embodiment of the present inventive concept.

FIG. 9 illustrates an example in which compensation is performed by using the pixels PX and the reference pixels PXr, according to an exemplary embodiment of the present inventive concept. Referring to FIGS. 1 and 9, compensation may be performed based on a first compensation unit CU1 and a second compensation unit CU2. The pixels PX and the reference pixels PXr of the pixel array 110 may be divided into first compensation units CU1 and second compensation units CU2.

For example, pixels PX and reference pixels PXr placed at a periphery of the pixel array 110 may constitute the first compensation units CU1. Pixels PX and reference pixels PXr placed at a central part of the pixel array 110, which are surrounded by the first compensation units CU1, may constitute the second compensation units CU2.

Each of the first compensation units CU1 and the second compensation units CU2 may include one reference pixel PXr and pixels PX arranged in two or more rows of pixels PX two or more columns. The reference pixel PXr may be placed at the center of the pixels PX in each of the first compensation units CU1 and/or the second compensation units CU2 (refer to FIG. 7) or may be placed at a first row of rows included in each of the first compensation units CU1 and/or the second compensation units CU2 (refer to FIG. 8). For example, the reference pixel PXr may be placed at a central region of each of the first compensation units CU1 and/or the second compensation units CU2. Image signals of the pixels PX belonging to the compensation unit CU may be compensated based on a dark signal of the reference pixel PXr belonging to the same compensation unit CU as the pixels PX.

For example, the number of pixels PX belonging to the first compensation unit CU1 may be smaller than the number of pixels PX belonging to the second compensation unit CU2. For example, the number of pixels PX included in a compensation unit CU1 or CU2 may change depending on a location of the compensation unit CU1 or CU2 and/or a pixel PX on the pixel array 110, in which the compensation unit CU1 or CU2 is placed.

Figure 10:
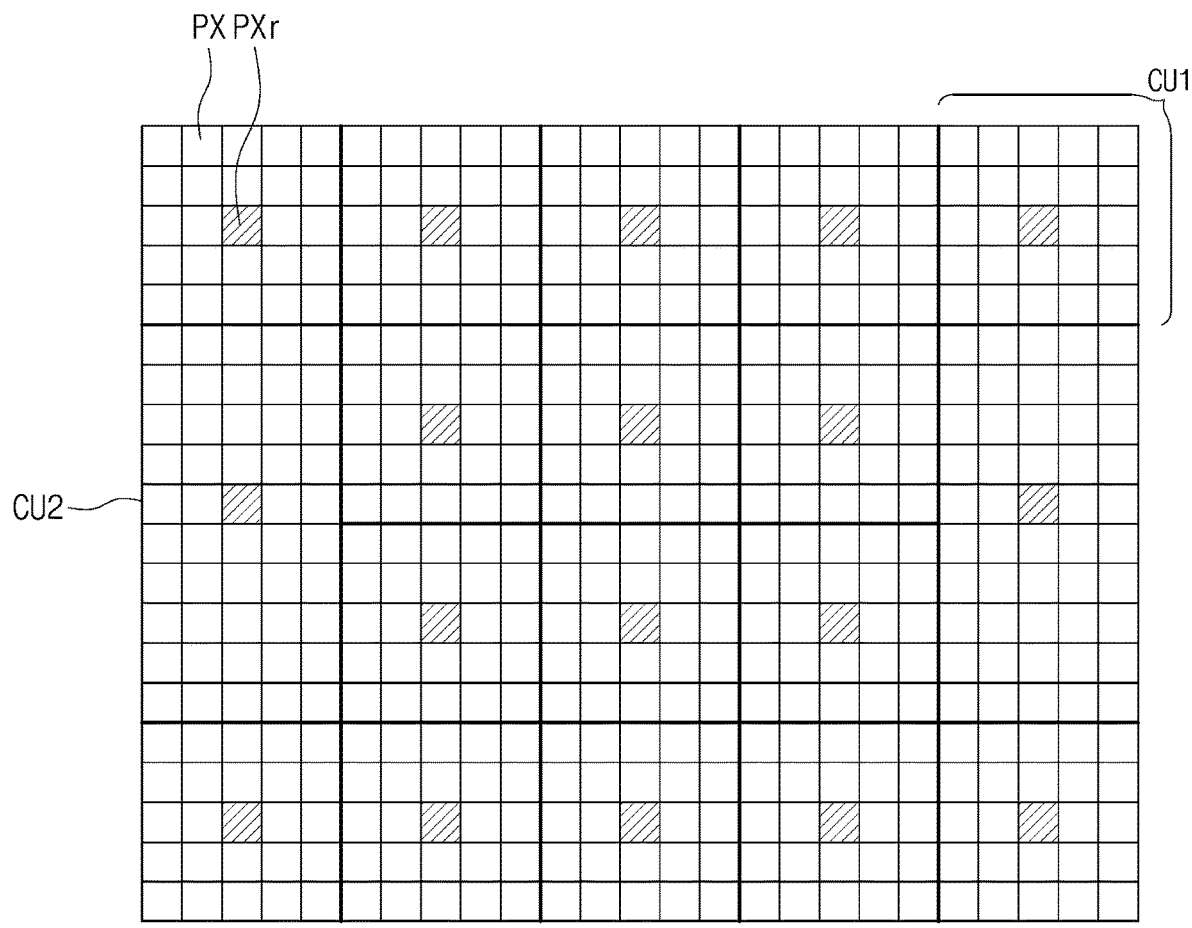
FIG. 10 illustrates an example in which compensation is performed by using pixels and reference pixels, according to an exemplary embodiment of the present inventive concept.

FIG. 10 illustrates an example in which compensation is performed by using the pixels PX and the reference pixels PXr, according to an exemplary embodiment of the present inventive concept. Referring to FIGS. 1 and 10, compensation may be performed based on a first compensation unit CU1 and a second compensation unit CU2. The pixels PX and the reference pixels PXr of the pixel array 110 may be divided into first compensation units CU1 and second compensation units CU2.

For example, pixels PX and reference pixels PXr placed at a periphery of the pixel array 110 may constitute the first compensation units CU1 or the second compensation units CU2. Pixels PX and reference pixels PXr placed at a central part of the pixel array 110 may constitute the first compensation units CU1.

Each of the first compensation units CU1 and the second compensation units CU2 may include one reference pixel PXr and pixels PX arranged in two or more rows and in two or more columns. The reference pixel PXr may be placed at the center of the pixels PX in each of the first compensation units CU1 and/or the second compensation units CU2 (refer to FIG. 7) or may be placed at a first row, that is selected first, from rows included in each of the first compensation units CU1 and/or the second compensation units CU2 (refer to FIG. 8). Image signals of the pixels PX belonging to the compensation unit CU may be compensated based on a dark signal of the reference pixel PXr belonging to the same compensation unit CU as the pixels PX.

For example, the number of pixels PX belonging to the first compensation unit CU1 may be smaller than the number of pixels PX belonging to the second compensation unit CU2. For example, the number of pixels PX included in a compensation unit CU1 or CU2 may change depending on a location of the compensation unit CU1 or CU2 and/or a pixel PX on the pixel array 110, in which the compensation unit CU1 or CU2 is placed.

Figure 11:
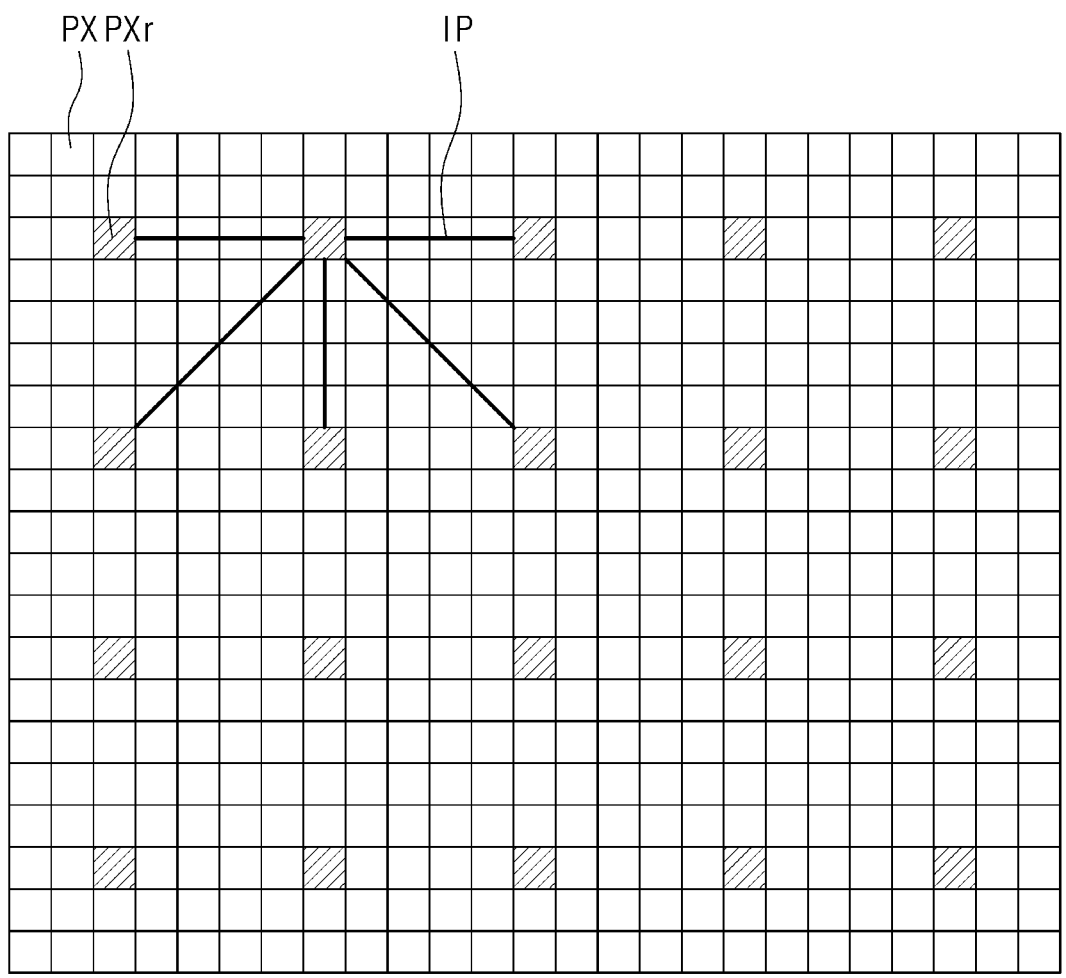
FIG. 11 illustrates an example in which compensation is performed by using pixels and reference pixels, according to an exemplary embodiment of the present inventive concept.

FIG. 11 illustrates an example in which compensation is performed by using the pixels PX and the reference pixels PXr, according to an exemplary embodiment of the present inventive concept. Referring to FIGS. 1 and 11, compensation may be performed based on interpolation.

As marked by an interpolation line IP in FIG. 11, compensation may be performed based on dark signals of two reference pixels PXr that are most adjacent to each other in a row direction, a column direction, and/or a diagonal direction. For example, based on a result value of interpolation performed on reference pixels PXr that are the most adjacent to each other in the row direction, the column direction, and/or the diagonal direction, image signals of pixels PX between the reference pixels PXr that are the most adjacent to each other in the row direction, the column direction, and/or the diagonal direction may be compensated.

For example, the interpolation may be a method of constructing new data by giving a weight to values of dark signals of two reference pixels PXr adjacent to each other. For example, the interpolation may be linear interpolation or Gaussian interpolation.

By way of example of the linear interpolation, a weight of a dark signal of one reference pixel PXr of two adjacent reference pixels PXr may linearly decrease as a distance from the one reference pixel PXr increases. By way of example of the Gaussian interpolation, a weight of a dark signal of one reference pixel PXr of two adjacent reference pixels PXr may decrease based on the Gaussian interpolation as a distance from the one reference pixel PXr increases.

For example, when a specific pixel PX is placed at the same row as two reference pixels PXr, an image signal of the specific pixel PX may be compensated based on interpolation of dark signals of the two reference pixels PXr belonging to the same row as the pixel PX.

When a specific pixel PX is placed at the same column as two reference pixels PXr, an image signal of the specific pixel PX may be compensated based on interpolation of dark signals of the two reference pixels PXr belonging to the same column as the pixel PX.

When a specific pixel PX is not placed at the same column or the same row as two reference pixels PXr, an image signal of the specific pixel PX may be compensated based on interpolation of dark signals of four reference pixels PXr that are the most adjacent to each other in the row direction, the column direction, and/or the diagonal direction.

Figure 12:
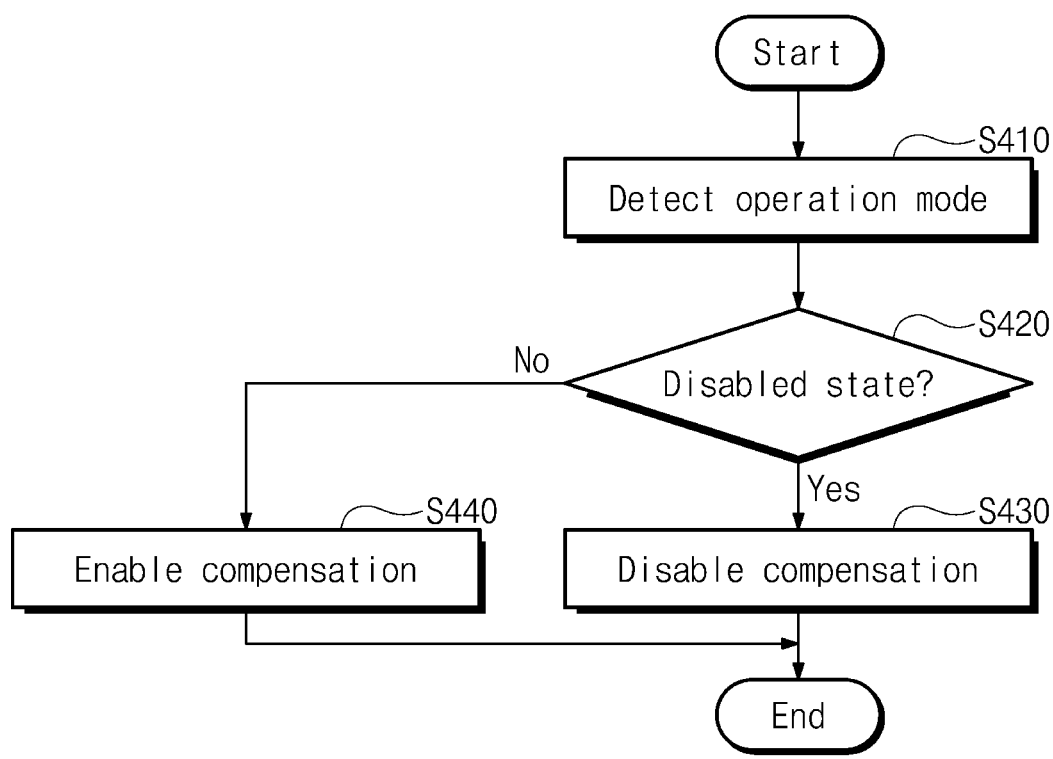
FIG. 12 illustrates an example of an operating method of an image sensor according to an exemplary embodiment of the present inventive concept.

FIG. 12 illustrates an example of an operating method of the image sensor 100 according to an exemplary embodiment of the present inventive concept. Referring to FIGS. 1 and 12, in operation S410, the image sensor 100 may detect an operation mode. For example, the image sensor 100 may detect an operation mode by checking a value stored in a register, which is capable of being set by an external device, from among registers of the interface circuit 150.

For example, a first value stored in the register may indicate an enabled state of compensation for a dark-level leakage. A second value stored in the register may indicate a disabled state of compensation for a dark-level leakage.

In operation S420, the image sensor 100 may determine whether the compensation for a dark-level leakage is in the disabled state. When the compensation for a dark-level leakage is in the disabled state, in operation S430, the image sensor 100 may disable the compensation for a dark-level leakage. For example, the analog sensing circuit 130 may output the first image data ID1 including dark levels of the reference pixels PXr, but the digital logic circuit 140 may ignore the dark levels of the reference pixels PXr.

When the compensation for a dark-level leakage is in the enabled state, in operation S440, the image sensor 100 may enable the compensation for a dark-level leakage. The image sensor 100 may perform the compensation for a dark-level leakage described with reference to FIGS. 1 to 11.

Figure 13:
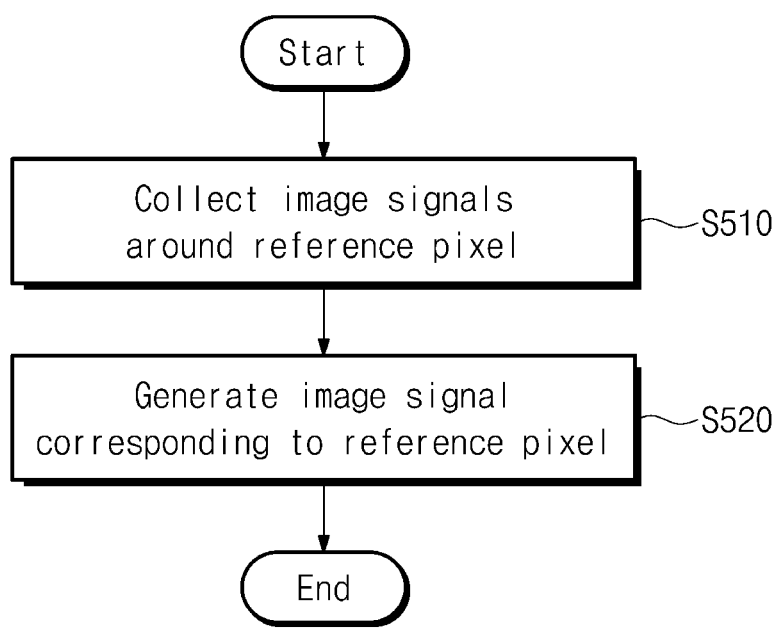
FIG. 13 illustrates an example of an operating method of an image sensor according to an exemplary embodiment of the present inventive concept.

FIG. 13 illustrates an example of an operating method of the image sensor 100 according to an exemplary embodiment of the present inventive concept. Referring to FIGS. 1 and 13, in operation S510, the digital logic circuit 140 of the image sensor 100 may collect image signals of pixels PX at least partially surrounding each of the reference pixels PXr (e.g., that are the most adjacent to each other in the row direction, the column direction, and/or the diagonal direction).

In operation S520, the digital logic circuit 140 may generate an image signal of each of the reference pixels PXr, based on the collected image signals. For example, the digital logic circuit 140 may generate image signals respectively corresponding to the reference pixels PXr, by performing interpolation on the image signals of the pixels PX surrounding each of the reference pixels PXr.

Figure 14:
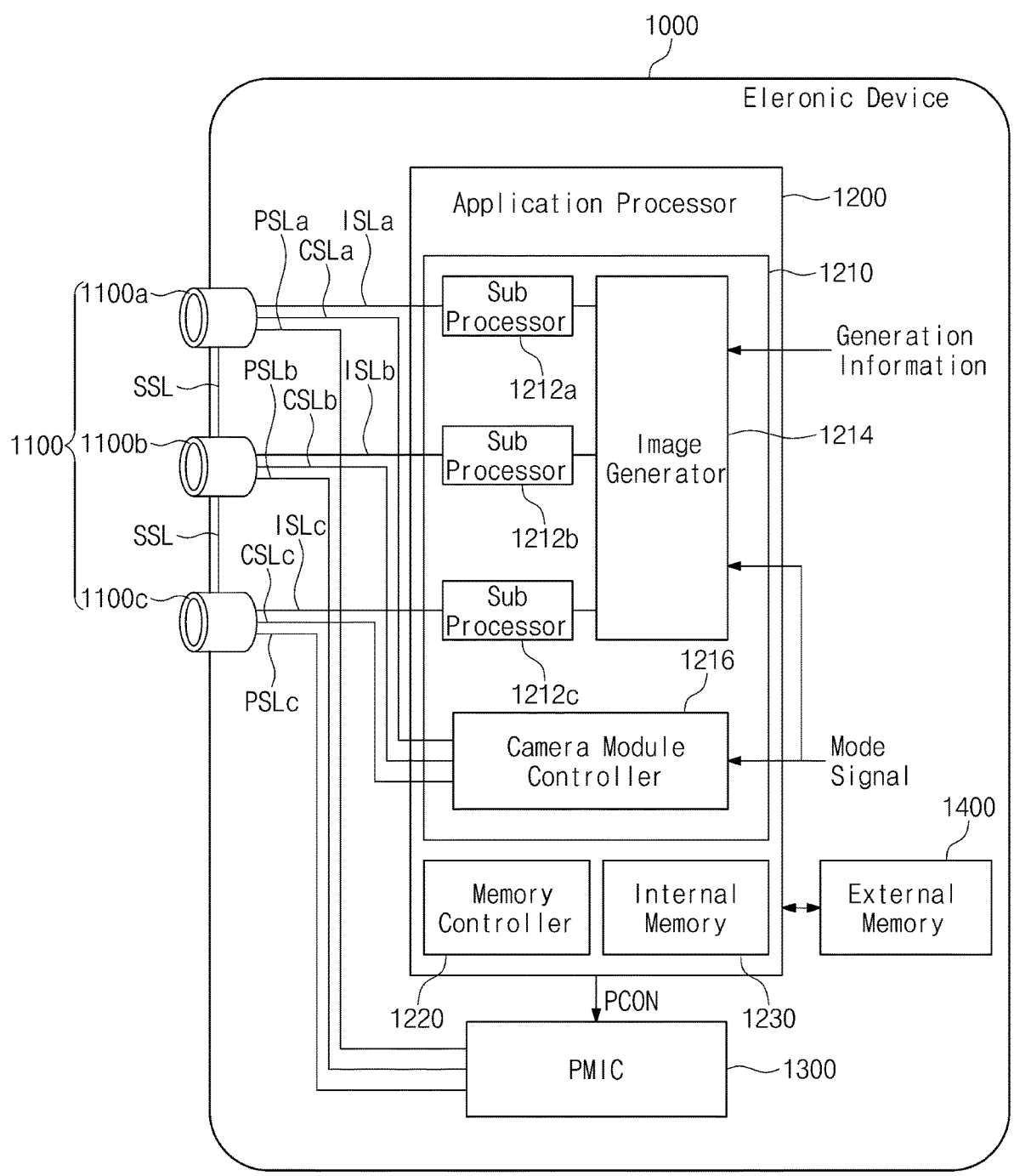
FIG. 14 is a block diagram of an electronic device including a camera module group according to an exemplary embodiment of the present inventive concept.
Figure 15:
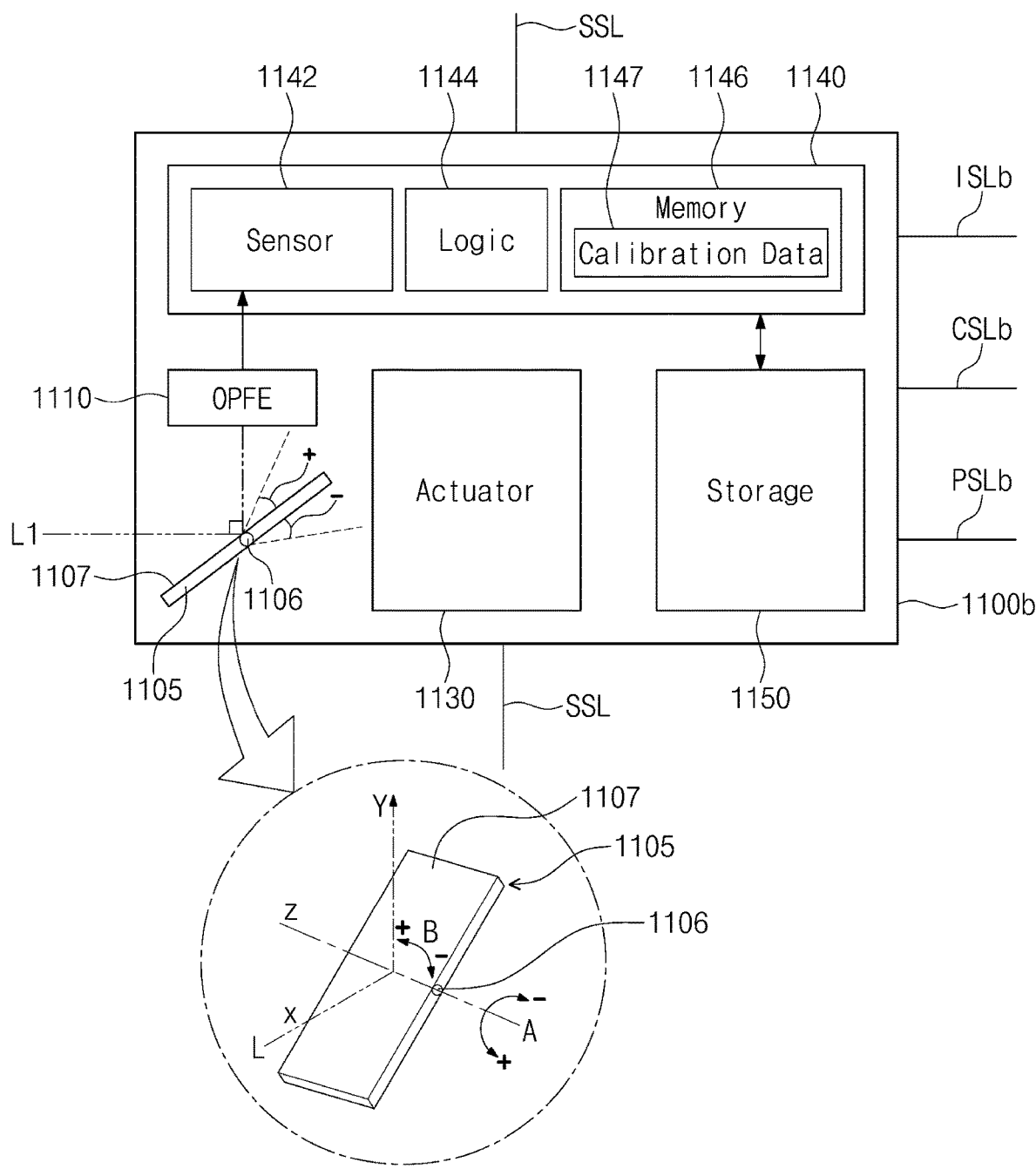
FIG. 15 is a block diagram of one camera module of camera modules in a camera module group of FIG. 14.

FIG. 14 is a block diagram of an electronic device 1000 including a camera module group 1100 according to an exemplary embodiment of the present inventive concept. FIG. 15 is a block diagram of one camera module (e.g., 1100*b*) of camera modules 1100*a*, 1100*b*, and 1100*c* in the camera module group 1100 of FIG. 14. For example, structures of the camera modules 1100*a*, 1100*b*, and 1100*c* may be the same or may be at least similar to each other.

Referring to FIG. 14, the electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. An electronic device including three camera modules 1100*a*, 1100*b*, and 1100*c* is illustrated in FIG. 14, but the present inventive concept is not limited thereto. In an exemplary embodiment of the present inventive concept, the camera module group 1100 may be modified to include only two camera modules. In addition, in an exemplary embodiment of the present inventive concept, the camera module group 1100 may be modified to include "n" camera modules (n being a natural number of 4 or more).

Below, a detailed configuration of the camera module 1100*b* will be more fully described with reference to FIG. 15, but the following description may be equally applied to the remaining camera modules 1100*a* and 1100*c*.

Referring to FIG. 15, the camera module 1100*b* may include a prism 1105, an optical path folding element (OPFE) 1110, an actuator 1130, an image sensing device 1140, and storage 1150.

The prism 1105 may include a reflecting plane or surface 1107 of a light reflecting material, and may change a path of a light "L" incident from the outside.

In an exemplary embodiment of the present inventive concept, the prism 1105 may change a path of the light "L" that is incident in a first direction "X" to a second direction "Y" perpendicular to the first direction "X". In addition, the prism 1105 may change the path of the light "L" that is incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In an exemplary embodiment of the present inventive concept, as illustrated, a maximum rotation angle of the prism 1105 in direction "A" may be equal to or smaller than about 15 degrees in a positive A direction and may be greater than about 15 degrees in a negative A direction, but the present inventive concept is not limited thereto.

In an exemplary embodiment of the present inventive concept, the prism 1105 may move, with respect to the second direction "Y", within approximately 20 degrees in a positive or negative B direction, between about 10 degrees and about 20 degrees, or between about 15 degrees and about 20 degrees; here, the prism 1105 may move at the same angle in the positive or negative B direction or may move at a similar angle within approximately 1 degree.

In an exemplary embodiment of the present inventive concept, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100*b*. For example, when a default optical zoom ratio of the camera module 1100*b* is "Z", the optical zoom ratio of the camera module 1100*b* may be changed to an optical zoom ratio of 3Z, 5Z, or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing of an image of an object.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100*b*. For example, the control logic 1144 may control an operation of the camera module 1100*b* based on a control signal provided through a control signal line CSLb.

The memory 1146 may store information, which is used for an operation of the camera module 1100*b*, such as calibration data 1147. The calibration data 1147 may include information for the camera module 1100*b* to generate image data by using the light "L" provided from the outside. The calibration data 1147 may include, for example, information about the degree of rotation described above, information about a focal length, information about an optical axis, etc. In the case where the camera module 1100*b* is implemented in the form of a multi-state camera in which a focal length varies depending on a location of an optical lens, the calibration data 1147 may include, for example, a focal length value for each location (or state) of the optical lens and information about auto focusing.

The storage 1150 may store image data sensed through the image sensor 1142. For example, the storage 1150 may be disposed outside the image sensing device 1140 and may be implemented in a shape where the storage 1150 and a sensor chip constituting the image sensing device 1140 are stacked; however, the present inventive concept is not limited thereto. In an exemplary embodiment of the present inventive concept, the storage 1150 may be implemented with an electrically erasable programmable read only memory (EEPROM), but the present inventive concept is not limited thereto.

For example, the image sensor 1142 or the image sensing device 1140 may correspond to the image sensor 100 of FIG. 1.

Referring together to FIGS. 14 and 15, in an exemplary embodiment of the present inventive concept, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In an exemplary embodiment of the present inventive concept, one camera module (e.g., 1100b) among the plurality of camera modules 1100a, 1100b, and 1100c may be a folded lens type including the prism 1105 and the OPFE 1110 described above, and the remaining camera modules (e.g., 1100a and 1100c) may be vertical camera modules not including the prism 1105 and the OPFE 1110 described above; however, the present inventive concept is not limited thereto.

In an exemplary embodiment of the present inventive concept, one camera module (e.g., 1100c) among the plurality of camera modules 1100a, 1100b, and 1100c may be, for example, a vertical depth camera capable of extracting depth information by using an infrared ray (IR). For example, the application processor 1200 may merge image data provided from the depth camera and image data provided from any other camera module (e.g., 1100a or 1100b), and may generate a three-dimensional (3D) depth image.

In an exemplary embodiment of the present inventive concept, at least two camera modules (e.g., 1100a and 1100b) among the plurality of camera modules 1100a, 1100b, and 1100c may have different fields of view. For example, the at least two camera modules (e.g., 1100a and 1100b) among the plurality of camera modules 1100a, 1100b, and 1100c may include different optical lens, but the present inventive concept is not limited to.

In addition, in an exemplary embodiment of the present inventive concept, fields of view of the plurality of camera modules 1100a, 1100b, and 1100c may be different from one another. In this case, the plurality of camera modules 1100a, 1100b, and 1100c may include different optical lens, but the present inventive concept is not limited thereto.

In an exemplary embodiment of the present inventive concept, the plurality of camera modules 1100a, 1100b, and 1100c may be disposed to be physically separated from each other. For example, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 14, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 may be implemented on a semiconductor chip separate from the semiconductor chip on which the plurality of camera modules 1100a, 1100b, and 1100c may be implemented.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa. In addition, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present inventive concept is not limited thereto.

In addition, in an exemplary embodiment of the present inventive concept, one sub image processor may be disposed to correspond to a plurality of camera modules. For example, the sub image processor 1212a and the sub image processor 1212c may be integrally implemented, and not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information, "Generation Information", or a mode signal.

For example, the image generator 1214 may generate the output image by merging at least a portion of the image data respectively generated from the camera modules 1100a, 1100b, and 1100c having different fields of view, depending on the image generating information, "Generation Information", or the mode signal. In addition, the image generator 1214 may generate the output image by selecting one of the image data respectively generated from the camera modules 1100a, 1100b, and 1100c having different fields of view, depending on the image generating information, "Generation Information", or the mode signal.

In an exemplary embodiment of the present inventive concept, the image generating information, "Generation Information", may include a zoom signal or a zoom factor. In addition, in an exemplary embodiment of the present inventive concept, the mode signal may be, for example, a signal based on a mode selected from a user.

In the case where the image generating information, "Generation Information", is the zoom signal (or zoom factor) and the camera modules 1100a, 1100b, and 1100c have different visual fields of view, the image generator 1214 may perform different operations depending on a type of the zoom signal. For example, in the case where the zoom signal is a first signal, the image generator 1214 may merge the image data output from the camera module 1100a and the image data output from the camera module 1100c, and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present inventive concept is not limited thereto, and a way to process image data may be modified without limitation if necessary.

In an exemplary embodiment of the present inventive concept, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the image generating information, "Generation Information", which includes a zoom signal or the mode signal, and the remaining camera modules (e.g., 1100a and 1100c) may be designated as slave cameras. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master or a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In addition, in the case where the zoom factor indicates a high zoom ratio, the camera module 1100a may operate as a master, and the camera module 1100b may operate as a slave.

In an exemplary embodiment of the present inventive concept, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal, and may provide the generated sync signal to the camera modules 1100a and 1100c through a sync signal line SSL. The camera module 1100b and the camera modules 1100a and 1100c may be synchronized with the sync signal to transmit image data to the application processor 1200.

In an exemplary embodiment of the present inventive concept, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or in the external memory 1400 placed outside the application processor 1200. In addition, the application processor 1200 may read and decode the encoded image signals from the internal memory 1230 or the external memory 1400, and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. For example, the power control signal PCON may include information about a camera module operating in the low-power mode and a set power level. Levels of the powers respectively provided to the plurality of camera modules 1100a, 1100b, and 1100c may be substantially identical to each other or may be different from each other. In addition, a level of a power may be dynamically changed.

In the above embodiments, components according to the present inventive concept may be described by using the terms "first", "second", "third", etc. However, the terms "first", "second", "third", etc. are used only to distinguish components from each other and do not limit the present inventive concept. For example, the terms "first", "second", "third", etc. do not involve an order or a numerical meaning of any form.

In the above embodiments, components according to embodiments of the present inventive concept may be referenced by using "blocks", "modules" or "units". The "blocks", "modules" or "units" may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. In addition, the "blocks", "modules" or "units" may include circuits implemented with semiconductor elements in an integrated circuit, or circuits enrolled as an intellectual property (IP).

According to the present inventive concept, an image sensor may sense dark-level leakages according to locations on a pixel array and may compensate image data based on the dark-level leakages. Accordingly, an image sensor providing image data of increased quality, an operating method of the image sensor, and an electronic device including the image sensor are provided.

While the present inventive concept has been particularly shown and described with reference to exemplary embodiments thereof, it will be apparent to those of ordinary skill in the art that various changes in form and detail may be made thereto without departing from the spirit and scope of the present inventive concept.

What is claimed is:

1. An image sensor comprising:
a pixel array including pixels and reference pixels;
an analog sensing circuit configured to sense signals from the pixels and the reference pixels; and
a digital logic circuit configured to receive the sensed signals from the analog sensing circuit and configured to compensate signals corresponding to the pixels from among the sensed signals by using signals corresponding to the reference pixels from among the sensed signals,
wherein each of the reference pixels is at least partially surround by the pixels,
wherein the pixel array comprises compensation units,
wherein each of the compensation units includes one reference pixel of the reference pixels and two or more pixels of the pixels, and
wherein a size of a first compensation unit, of the compensation units, is different from a size of a second compensation unit, of the compensation units.

2. The image sensor of claim 1, wherein a structure of each of the reference pixels is the same as a structure of each of the pixels, and
wherein each of the reference pixels includes a reflection material reflecting a light incident from an outside of the reference pixels.

3. The image sensor of claim 1, wherein the digital logic circuit is configured to:
calculate leakages of the reference pixels based on the signals corresponding to the reference pixels; and
compensate leakages of the pixels based on the leakages of the reference pixels.

4. The image sensor of claim 3, wherein the leakages of the reference pixels are dark-level leakages.

5. The image sensor of claim 1,
wherein, in each of the compensation units, the digital logic circuit compensates signals of the two or more pixels based on a signal of the one reference pixel.

6. The image sensor of claim 5, wherein, in each of the compensation units, the two or more pixels are arranged in two or more rows and two or more columns, and the one reference pixel is disposed at a central region of each of the compensation units.

7. The image sensor of claim 5, wherein, in each of the compensation units, the two or more pixels are arranged in two or more rows and two or more columns, and the one reference pixel is disposed in a first row of the two or more rows.

8. The image sensor of claim 5, wherein a number of the two or more pixels included in each of the compensation units changes depending on a location of the pixels on the pixel array, in which each of the compensation units is disposed.

9. The image sensor of claim 8, wherein a number of pixels of the first compensation unit, of the compensation units, disposed in a central part of the pixel array is greater than a number of pixels of the second compensation unit, of the compensation units, disposed in a peripheral region of the pixel array.

10. The image sensor of claim 8, wherein, a number of pixels of the first compensation unit, of the compensation units, disposed in a central part of the pixel array is smaller than a number of pixels of the second compensation unit, of the compensation units, disposed in a peripheral region of the pixel array.

11. The image sensor of claim 1, wherein the digital logic circuit compensates signals of pixels, of the pixels, disposed between two adjacent reference pixels, based on interpolation of signals of reference pixels adjacent to each other from among the reference pixels.

12. The image sensor of claim 1, wherein the digital logic circuit disables compensation for the signals of the pixels in a disabled mode.

13. The image sensor of claim 1, wherein the digital logic circuit generates an image signal corresponding to each of the reference pixels based on signals of pixels, of the pixels, at least partially surrounding each of the reference pixels.

14. An operating method of an image sensor including pixels and reference pixels, the method comprising:
sensing signals from the pixels and the reference pixels;
compensating signals of the pixels from among the sensed signals, based on signals corresponding to the reference pixels from among the sensed signals; and
outputting the compensated signals,
wherein the reference pixels are disposed between the pixels,
wherein the pixels and the reference pixels form compensation units,
wherein each of the compensation units includes one reference pixel of the reference pixels and two or more pixels of the pixels, and
wherein a size of a first compensation unit, of the compensation units, is different from a size of a second compensation unit, of the compensation units.

15. The method of claim 14, wherein the signals of the reference pixels correspond to dark-level leakages.

16. The method of claim 14,
wherein the compensating of signals of the pixels from among the sensed signals includes:
compensating signals of the two or more pixels included in each of the compensation units, based on a signal of the one reference pixel included in each of the compensation units.

17. The method of claim 14, wherein the compensating includes:
compensating signals of pixels, of the signals of the pixels, disposed between two reference pixels, based on interpolation of signals corresponding to the two reference pixels from among the signals of the reference pixels.

18. The method of claim 14, wherein the compensating of signals of pixels from among the sensed signals is performed in response to entering an enabled mode, and
wherein the compensating of signals of pixels from among the sensed signals is omitted in response to entering a disabled mode.

19. The method of claim 14, further comprising:
generating image signals corresponding to the reference pixels, based on interpolation of signals, which correspond to pixels adjacent to the reference pixels, from among the signals of the pixels; and outputting the image signals.

20. An electronic device comprising:
a processor; and
an image sensor configured to generate image data and configured to provide the image data to the processor,
wherein the image sensor includes:
a pixel array including pixels and reference pixels;
an analog sensing circuit configured to sense signals from the pixels and the reference pixels;
a digital logic circuit configured to receive the sensed signals from the analog sensing circuit and configured to compensate signals corresponding to the pixels from among the sensed signals by using signals corresponding to the reference pixels from among the sensed signals; and
an interface circuit configured to output the compensated signals as the image data to the processor,
wherein each of the reference pixels includes:
a photodiode;
reflection material disposed on the photodiode;
a color filter disposed on the reflection material; and
a micro lens disposed on the color filter,
wherein the pixel array comprises compensation units,
wherein each of the compensation units includes one reference pixel of the reference pixels and two or more pixels of the pixels, and
wherein a size of a first compensation unit, of the compensation units, is different from a size of a second compensation unit, of the compensation units.

* * * * *